US008276167B2

(12) United States Patent
Challenger et al.

(10) Patent No.: US 8,276,167 B2
(45) Date of Patent: Sep. 25, 2012

(54) DISTRIBUTED PLUGGABLE MIDDLEWARE SERVICES

(75) Inventors: James R. Challenger, Garrison, NY (US); Louis R. Degenaro, White Plains, NY (US); James R. Giles, Yorktown Heights, NY (US); Rohit Wagle, Elmsford, NY (US)

(73) Assignee: International Business Machines Corporation, Armonk, NY (US)

(*) Notice: Subject to any disclaimer, the term of this patent is extended or adjusted under 35 U.S.C. 154(b) by 1125 days.

(21) Appl. No.: 11/689,010

(22) Filed: Mar. 21, 2007

(65) Prior Publication Data

US 2008/0235710 A1 Sep. 25, 2008

(51) Int. Cl.
*G06F 3/00* (2006.01)
*G06F 9/44* (2006.01)

(52) U.S. Cl. ........ 719/331; 719/328; 719/332; 717/162; 717/163; 717/165

(58) Field of Classification Search ........................ None
See application file for complete search history.

(56) References Cited

U.S. PATENT DOCUMENTS 4,884,228 A 11/1989 Stanley
6,076,105 A 6/2000 Wolff
6,343,287 B1 * 1/2002 Kumar et al. .......................... 1/1
6,611,876 B1 * 8/2003 Barrett et al. ................. 709/246
6,715,070 B1 3/2004 Peloquin
6,742,026 B1 5/2004 Kraenzel
6,785,721 B1 8/2004 Immerman
6,871,345 B1 3/2005 Crow
6,996,832 B2 * 2/2006 Gunduc et al. ................ 719/331
7,003,774 B2 2/2006 Mugica
7,024,451 B2 4/2006 Jorgenson
7,035,933 B2 4/2006 O'Neal
7,047,518 B2 5/2006 Little
7,665,071 B1 * 2/2010 Roles et al. ................... 717/130
2002/0035559 A1 * 3/2002 Crowe et al. ....................... 707/2
2002/0120685 A1 * 8/2002 Srivastava et al. ............ 709/203
2002/0149615 A1 * 10/2002 Rajarajan et al. ............. 345/738

(Continued)

OTHER PUBLICATIONS

"Notes on the Eclipse Plug-in Architecture" by Azad Bolour, http://www.eclipse.org/articles/Article-Plug-in-architecture/plugin_architecture.html (Dated Jul. 3, 2003).*

(Continued)

*Primary Examiner* — Lechi Truong
*Assistant Examiner* — Shih-Wei Kraft
(74) *Attorney, Agent, or Firm* — August Law, LLC; George Willinghan

(57) ABSTRACT

Plug-in configurable middleware is provided for managing distributed applications. The middleware includes at least one core runtime engine configured as a plurality of concurrent instantiations on one or more hosts within a distributed architecture. These hosts can represent separate nodes or a single node within the architecture. Each core runtime engine instance provides the minimum amount of functionality required to support the instantiation of one or more plug-ins within that core runtime engine instance. Each core runtime engine instance is in communication with other concurrent core runtime engine instances and can share the functionality of plug-in instances with the other core runtime engine instances, for example through the use of proxies. A plurality of personalities representing pre-defined functions is defined and one of more of these personalities is associated with each core runtime engine instance. A plurality of pre-defined plug-ins are defined and associated with the personalities.

27 Claims, 22 Drawing Sheets

U.S. PATENT DOCUMENTS

| | | | | |
|---|---|---|---|---|
| 2003/0135661 | A1* | 7/2003 | Barker et al. | 709/316 |
| 2003/0154401 | A1* | 8/2003 | Hartman et al. | 713/201 |
| 2003/0208374 | A1* | 11/2003 | Mangtani et al. | 705/1 |
| 2004/0003119 | A1* | 1/2004 | Munir et al. | 709/246 |
| 2004/0003139 | A1* | 1/2004 | Cottrille et al. | 709/331 |
| 2004/0003371 | A1* | 1/2004 | Coulthard et al. | 717/101 |
| 2004/0049481 | A1* | 3/2004 | Blevins | 707/1 |
| 2004/0059931 | A1* | 3/2004 | Fulkerson et al. | 713/200 |
| 2004/0061713 | A1* | 4/2004 | Jennings | 345/700 |
| 2004/0070604 | A1* | 4/2004 | Bhat et al. | 345/741 |
| 2004/0073782 | A1* | 4/2004 | Price et al. | 713/1 |
| 2004/0083454 | A1* | 4/2004 | Bigus et al. | 717/117 |
| 2004/0111525 | A1* | 6/2004 | Berkland et al. | 709/231 |
| 2005/0050311 | A1* | 3/2005 | Joseph et al. | 713/1 |
| 2006/0026591 | A1* | 2/2006 | Backhouse et al. | 717/177 |

OTHER PUBLICATIONS

Dorian Birsan,On Plug-Ins and Extensible Architectures,Software Updates, vol. 3NP Mar. 2, 2005.

* cited by examiner

200

| | 210 | 220 | |
|---|---|---|---|
| | **Core Runtime Engine Instance** | **Personalities** | |
| 211 | A | dispatcher | 221 |
| 212 | B | submit agent, node controller | 222 |
| 213 | C | submit agent | 223 |
| 214 | D | node controller | 224 |
| 215 | E | node controller | 225 |
| 216 | F | optimizer | 226 |
| 217 | G | dispatcher shadow, submit agent, node controller | 227 |

| Personalities | Plug-ins |
|---|---|
| 311 dispatcher | orchestrator, persistence, database-manager, communication, http-transport, timing-services, parser, graph-manager-interface. 321 330 |
| 312 submit agent | communication, http-transport, persistence, database-manager, job-submission. 322 |
| 313 node controller | communication, http-transport, parser, process-controller. 323 |
| 314 optimizer | communication, http-transport, scheduling-optimizer. 324 |
| 315 dispatcher shadow | orchestrator-backup, persistence, database-manager, communication, http-transport, timing-services, parser, graph-manager-interface. 325 330 |

FIG. 3

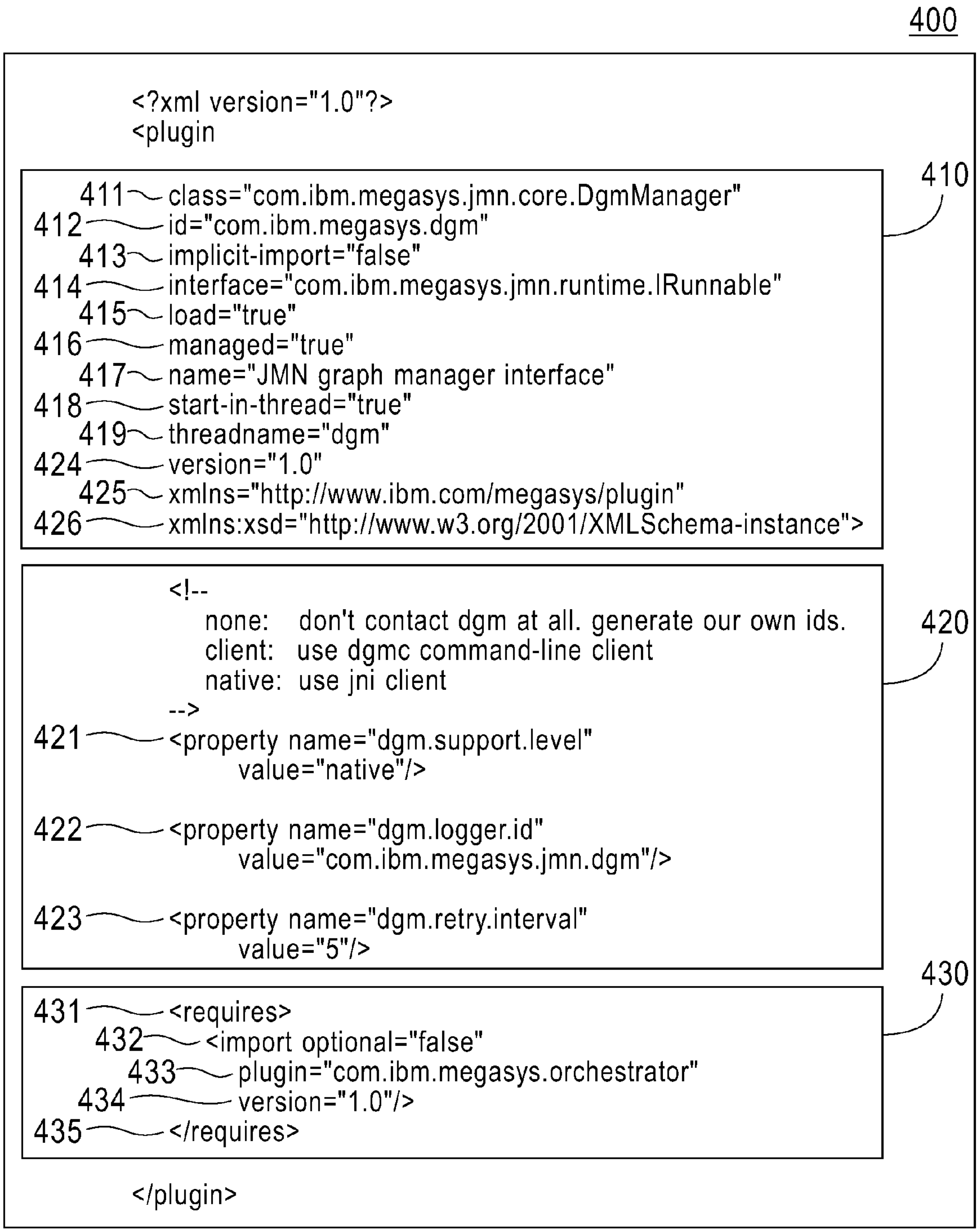

FIG. 4

```
                                        400
┌─────────────────────────────────────────────┐
│       <?xml version="1.0"?>                 │
│       <plugin                               │
│  ┌──────────────────────────────────────┐ 410
│  │  411──class="com.ibm.megasys.jmn.core.DgmManager"
│  │ 412────id="com.ibm.megasys.dgm"      │
│  │  413──implicit-import="false"        │
│  │ 414────interface="com.ibm.megasys.jmn.runtime.IRunnable"
│  │  415──load="true"                    │
│  │ 416────managed="true"                │
│  │  417──name="JMN graph manager interface"
│  │ 418────start-in-thread="true"        │
│  │  419──threadname="dgm"               │
│  │ 424────version="1.0"                 │
│  │  425──xmlns="http://www.ibm.com/megasys/plugin"
│  │ 426────xmlns:xsd="http://www.w3.org/2001/XMLSchema-instance">
│  └──────────────────────────────────────┘
│  ┌──────────────────────────────────────┐ 420
│  │    <!--                              │
│  │       none:   don't contact dgm at all. generate our own ids.
│  │       client: use dgmc command-line client
│  │       native: use jni client         │
│  │    -->                               │
│  │ 421────<property name="dgm.support.level"
│  │              value="native"/>        │
│  │                                      │
│  │ 422────<property name="dgm.logger.id"│
│  │              value="com.ibm.megasys.jmn.dgm"/>
│  │                                      │
│  │ 423────<property name="dgm.retry.interval"
│  │              value="5"/>             │
│  └──────────────────────────────────────┘
│  ┌──────────────────────────────────────┐ 430
│  │ 431────<requires>                    │
│  │    432────<import optional="false"   │
│  │       433────plugin="com.ibm.megasys.orchestrator"
│  │       434─────version="1.0"/>        │
│  │ 435────</requires>                   │
│  └──────────────────────────────────────┘
│       </plugin>                             │
└─────────────────────────────────────────────┘

```

1100

```
package com.ibm.megasys.jmn.runtime;
import java.util.Properties;
public interface IRuntime
{
public boolean getBooleanProperty(String name);
public int getIntProperty(String name);
public double getDoubleProperty(String name);
public long getLongProperty(String name);
public String getProperty(String name);
public String getStringProperty(String name);
public Properties getAllProperties();
}
```

```
     <?xml version="1.0"?>
     <plugin class="com.ibm.megasys.jmn.core.JmnOrchestrator"
          id="com.ibm.megasys.orchestrator"
          implicit-import="false"
          load="true"
1210      managed="true"
          name="Orchestration Service"
          start-in-thread="false"
          version="version"
          xmlns="http://www.ibm.com/megasys/plugin"
          xmlns:xsd="http://www.w3.org/2001/XMLSchema-instance">
1220   <properties uri="orchestrator.properties"/>
       <requires>
          <import optional="false"
             plugin="com.ibm.megasys.timerservice"
1230         version="import version"/>
          <import optional="false"
             plugin="com.ibm.megasys.nc.transmit"
             version="1.0"/>
       </requires>
     </plugin>
```

```
persistenceManager = com.ibm.megasys.jmn.persistence
transmit = com.ibm.megasys.nc.transmit
jdl-file-management = com.ibm.megasys.jdlFileManagement
#
# original fsm
#
fsm = jmn-fsm.xml
#
# size of fsm thread pool
#
fsm-threads = 10
#
#2005.01.10 dispatching timed retry (ld)
#
timer-service = com.ibm.megasys.timerservice
perDispatchRetryIntervalSeconds = 600
perDispatchRetryMaximum = 2000
```

```
<?xml version="1.0"?>
 <!--Update descriptor for new plugin organization.January 20, 2006.(jrc)-->
 <plugin class="com.ibm.megasys.jmn.persistence.PersistenceManager"
     id="com.ibm.megasys.persistence"
     implicit-import="true"
     load="true"
1410 managed="true"
     name="Persistence Manager Plugin"
     start-in-thread="false"
     version="1.0"
     xmlns="http://www.ibm.com/megasys/plugin"
     xmlns:xsd="http://www.w3.org/2001/XMLSchema-instance">
 <property name="hibernate.config"
      value="jmn.persistence.config"/>
 <property name="persistence.db.config.postgresql"
      value="jmn.persistence.config.postgres"/>
1420 <property name="persistence.db.config.hsqldb"
      value="jmn.persistence.config.hsqldb"/>
 <property name="persistence.db.config.db2"
      value="jmn.persistence.config.db2"/>
 <property name="persistence.createschema"
      value="true"/>
 <requires>
   <import optional="false"
1430  plugin="com.ibm.megasys.jmn.db"
      version="1.0"/>
 </requires>
</plugin>
```

```
<?xml version="1.0"?>
<!--Update descriptor for new plugin organization.January 20, 2006.(jrc)-->
<plugin class="com.ibm.megasys.jmn.persistence.database.HSQLPlugin"
    id="com.ibm.megasys.jmn.db"
    implicit-import="true"
    interface="com.ibm.megasys.jmn.runtime.IRunnable"
    load="true"
    managed="true"
    name="HSQL Database"
    start-in-thread="true"
    threadname="hsqldb"
    version="1.0"
    xmlns="http://www.ibm.com/megasys/plugin"

    <properties url="jmn.hsqldb.properties"/>

</plugin>
```

1520

1521

```
#hsql.port> port on which to start db
#hsql.dbnum> number of databases
#hsql.db.path.n=jmn > path of database
#hsql.db.name.n=jmn > name of database


hsql.port=1234
hsql.dbnum=1
hsql.db.name.0=jmn.db
```

```
<?xml version="1.0"?>
 <plugin
class="com.ibm.megasys.jmn.comm.sync.transmit.SynchronousTransfer"
     id="com.ibm.megasys.jmn.comm.sync.transmit"
     implicit-import="true"
     load="true"
     managed="true"
     name="SynchronousTransferAPI"
     start-in-thread="false"
     threadname="SynchronousTransferAPI"
     version="1.0"
     xmlns="http://www.ibm.com/megasys/plugin">
  <property name="sTransfer.http"
value="com.ibm.megasys.jmn.comm.sync.transmit.service.http"/>
 </plugin>
```

1611

```
<?xml version="1.0"?>
  <plugin class="com.ibm.megasys.jmn.comm.sync.receive.SynchronousReceive"
     id="com.ibm.megasys.jmn.comm.sync.receive"
     implicit-import="true"
     load="true"
     managed="true"
     name="SynchronousReceiveAPI"
     start-in-thread="false"
     threadname="SynchronousReceiveAPI"
     version="1.0"
     xmlns="http://www.ibm.com/megasys/plugin">
 </plugin>
```

```
<?xml version="1.0"?>
```

1710

```
<plugin class="com.ibm.megasys.jmn.comm.sync.transmit.HTTPService"
    id="com.ibm.megasys.jmn.comm.sync.transmit.service.http"
    implicit-import="false"
    load="true"
    managed="true"
    name="SynchronousTransferServiceHTTP"
    start-in-thread="false"
    threadname="SynchronousTransferServiceHTTP"
    version="1.0"
    xmlns="http://www.ibm.com/megasys/plugin">
</plugin>
```

```
<?xml version="1.0"?>
```

1711

```
  <plugin class="com.ibm.megasys.jmn.comm.sync.receive.HTTPService"
    id="com.ibm.megasys.jmn.comm.sync.receive.service.http"
    implicit-import="true"
    load="true"
    managed="true"
    name="SynchronousReceiveServiceHTTP"
    start-in-thread="false"
    threadname="SynchronousReceiveServiceHTTP"
    version="1.0"
    xmlns="http://www.ibm.com/megasys/plugin">
```

1730

```
  <requires>
    <import optional="false"
        plugin="com.ibm.megasys.http.server"
        version="1.0"/>
    <import optional="false"
        plugin="com.ibm.megasys.jmn.comm.syn.receive"
        version="1.0"/>
    </requires>
</plugin>
```

```
<?xml version="1.0"?>
<plugin class="com.ibm.megasys.jmn.util.TimerService"
      id="com.ibm.megasys.timerservice"
      implicit-import="false"
      load="true"
      managed="true"
      name="Timer Service"
      start-in-thread="false"
      threadname="timer"
      version="1.0"
      xmlns="http://www.ibm.com/megasys/plugin"
      xmlns:xsd="http://www.w3.org/2001/XMLSchema-instance">
</plugin>
```

```
     <?xml version="1.0"?>
    ┌<plugin class="com.ibm.megasys.jmn.core.JdlParser"
    │      id="com.ibm.megasys.jdlparser"
    │      implicit-import="false"
    │      interface="com.ibm.megasys.jmn.runtime.IRunnable"
    │      load="true"
1910┤      managed="true"
    │      name="JDL Parsing Service"
    │      start-in-thread="true"
    │      threadname="parser"
    │      version="1.0"
    │      xmlns="http://www.ibm.com/megasys/plugin"
    └      xmlns:xsd="http://www.w3.org/2001/XMLSchema-instance">
    ┌  <requires>
    │   <import optional="false"
1930┤         plugin="com.ibm.megasys.orchestrator"
    │         version="1.0"/>
    └  </requires>
     </plugin>
```

```
<?xml version="1.0"?>
<plugin class="com.ibm.megasys.jmn.api.server.ApiServerPlugin"
      id="com.ibm.megasys.api"
      implicit-import="false"
      load="true"
      managed="true"
      name="User API manager"
      threadname="api"
      version="1.0"
      xmlns="http://www.ibm.com/megasys/plugin">
   <property name="ochestrator"
         value="com.ibm.megasys.orchestrator"/>
   <list id="services">
     <item value="com.ibm.megasys.jmn.api.server.SubmitRequest"/>
     <item value="com.ibm.megasys.jmn.api.server.CancelRequest"/>
   </list>
   <requires>
     <import optional="false"
          id="orchestrator"
          plugin="com.ibm.megasys.orchestrator"
          version="1.0"/>
     <import optional="false"
        id="receive"
        plugin="com.ibm.megasys.jmn.comm.sync.receive"
        version="1.0"/>
  </requires>
</plugin>
```

2010 (plugin element attributes, from `<plugin class=…` through `xmlns=…>`)

2020 (property and list of services)

2030 (requires block)

FIG. 20

```
<?xml version="1.0"?>
<plugin class="com.ibm.megasys.jmn.nc.NodeController"
    id="com.ibm.megasys.nodecontroller"
    implicit-import="false"
    load="true"
    managed="true"
    name="Node Controller Service"
    start-in-thread="true"
    threadname="mnc"
    version="1.0"
    xmlns="http://www.ibm.com/megasys/plugin">
  <property name="services" value="pojava C java"/>
  <property name="service.pojava" value="com.ibm.megasys.nc.adapter.pojo.PoJavaService"/>
  <property name="service.C" value="com.ibm.megasys.nc.adapter.corba.ReliableCorbaService"/>
  <property name="service.java" value="com.ibm.megasys.nc.adapter.corba.ReliableCorbaService"/>
  <property name="transmit" value="com.ibm.megasys.nc.transmit.jobmanager"/>
</plugin>
```

```
<?xml version="1.0"?>
  <!--Update descriptor for new plugin organization.January 20, 2006.(jrc)-->
  <plugin class="com.ibm.megasys.jmn.core.OptimizerManager"
      id="com.ibm.megasys.optimizer"
      implicit-import="false"
      interface="com.ibm.megasys.jmn.runtime.IRunnable"
      load="true"
      managed="true"
      name="JMN optimizer manager"
      start-in-thread="true"
      threadname="opt"
      version="1.0"
      xmlns="http://www.ibm.com/megasys/plugin"
      xmlns:xsd="http://www.w3.org/2001/XMLSchema-instance">
   <property name="orchestrator" value="com.ibm.distillery.orchestrator"/>
   <requires>
    <import optional="false"
          plugin="com.ibm.megasys.orchestrator"
          version="1.0"/>
   </requires>
</plugin>
```

2210 (the <plugin ...> element start tag and its attributes)

2220 (the <property> element)

2230 (the <requires> element)

FIG. 22

DISTRIBUTED PLUGGABLE MIDDLEWARE SERVICES

STATEMENT REGARDING FEDERALLY SPONSORED RESEARCH

The invention disclosed herein was made with U.S. Government support under Contract No. H98230-05-3-0001 awarded by the U.S. Department of Defense. The Government has certain rights in this invention.

FIELD OF THE INVENTION

The present invention relates to information processing systems. More particularly, the present invention relates to methods and apparatus for pluggable middleware services in a distributed computing environment.

BACKGROUND OF THE INVENTION

In the realm of computer technology, plug-ins have been key to building customized applications. A minimal kernel provides an application program interface (API) for defining one or more plug-ins that each contains additional functionality. The API nominally provides means for plug-ins to perform various tasks, such as registering with the kernel, transferring data to and from the kernel and/or other plug-ins, and other common undertakings. Once a plug-in has been logically added to the kernel, the unified application now provides altered behavior over and above that of the kernel alone.

Plugs-in are typically employed to add functionality to interactive development environment (IDE) tools for writing software applications, such as Eclipse (see www.eclipse.org). Internet browsers, such as Mozilla Firefox (see www.mozilla.com) and Microsoft Internet Explorer (see www.microsoft.com/windows/ie) also augment their runtimes with additional behavior through plug-ins. Operating systems embrace plug-in device drivers. Other examples of core runtimes (hardware, firmware, and software based) that enable extensibility though plug-ins are abundant.

Browsers and IDE tools are typically single user, single computer applications. In the prior art, plug-ins have not been employed to manage a distributed architecture as taught by the present invention. Traditional operating systems are not distributed, for example where different functions are handled by different cooperating instances.

Distribution of function (objects or services) is well known in the related art. For example, a cohesive distributed system to manage batch jobs may be comprised of submit, schedule, and run functions. In the deployment of such a distributed system, one or more hosts may be configured to perform one or more of these functions. Typically, the requisite software is custom installed or is accessible on each node by means of file sharing. Then at system or application boot time, the host-specific processes are launched, as preconfigured for each host. Thus, on one host one process may be launched for carrying out the submit function, and a second process may be launched to carry out the run function. These different processes may be sharing the same code libraries, but since they are in separate processes they each have their own runtime memory image.

One methodology for managing distributed function is through distributed object technologies, such as the Common Object Request Broker Architecture (CORBA), the Distributed Component Object Model (DCOM), and Remote Method Invocation (RMI). Also known in the related art are web services, which have three main aspects: the web service that processes Extensible Markup Language XML documents; the XML documents that conform to an XML schema, which completely describes valid service requests; and the web service that can be addressed by a requester using one or more protocols such as Transmission Control Protocol (TCP) or Hypertext Transfer Protocol (HTTP). None of these solutions, however, employ coordinated plug-ins to manage a distributed environment.

SUMMARY OF THE INVENTION

Systems in accordance with the present invention are directed to plug-in configurable middleware for managing distributed applications. This middleware includes at least one core runtime engine capable of a plurality of concurrent instantiations on at least one host. Each core runtime engine instance contains sufficient functionality to support plug-in architecture, and each core runtime instance is in communication with other concurrent core runtime engine instances. Suitable hosts include, but are not limited to, computer hardware platforms, virtual machines and combinations thereof.

The system also includes a plurality of personalities. One or more of these personalities is associated with one or more of the plurality of concurrent core runtime engine instances. That is each runtime engine instance can have one or more associated personalities. Each personality contains a definition of the function of the core runtime engine instance to which that personality is associated. The system includes a plurality of pre-defined plug-ins. Each plug-in is associated with one or more of the plurality of personalities and contains the runtime code that provides at least a portion of the function of each personality to which the plug-in is associated. Therefore, each plug-in represents a basic unit of functionality, and each plug-in is utilized by each core runtime engine instance having an associated personality to which the plug-in is associated. In one embodiment, each plug-in also includes a core definition that contains the instructions for loading and starting the plug-in, a properties section that contains a set of plug-in properties specific to that plug-in and a dependencies section that contains a description of relationships between that plug-in and another plug-in.

In one embodiment, a schema is provided that contains parameters for validating each pre-defined plug-in. Each plug-in can be an extensible mark-up language document, and the schema can be an extensible mark-up language schema.

The middleware also includes at least one configuration manager in communication with each one of the plurality of core runtime engine instances. The configuration manager is capable of determining an architecture for the distributed middleware and of distributing plug-ins to the core runtime engine instances. At least one persistent storage device is provided in communication with the configuration manager. The persistent storage device holds the plurality of plug-ins. In one embodiment, the host includes an interface mechanism in communication with the configuration manager to facilitate instantiations of the core runtime engine on the host in accordance with the determined architecture.

A plug-in instance management application program interface is provided to facilitate dynamic runtime management of each plug-in. Dynamic runtime management includes creating plug-ins, retrieving plug-ins from a persistent storage location, updating plug-ins, deleting plug-ins, loading plug-ins, unloading plug-ins, reloading plug-ins and combinations thereof. In one embodiment, the execution of one of the plurality of plug-ins is dependent upon execution of another one of the plurality of plug-ins.

The middleware can include at least one proxy associated with a first core runtime engine instance. The proxy is associated with a plug-in instance resident on a second core runtime instance and facilitates utilization of the plug-in instance by the first core runtime engine instance. A proxy management application program interface is provided to facilitate dynamic runtime management of the proxy. This dynamic runtime management includes finding plug-ins, finding proxies, creating a plug-in for a proxy, destroying a proxy for a plug-in, static proxy routing, dynamic proxy routing and combinations thereof.

The present invention is also directed to methods for managing a computer application within a distributed environment. These methods include defining a plurality of personalities wherein each personality includes a pre-defined function. At least one plug-in is associated with each personality, and each plug-in contains the runtime code that provides at least a portion of the function of the personality to which the plug-in is associated.

A core runtime engine is instantiated on one or more hosts within the distributed environment. Each core runtime engine instance includes sufficient functionality to support plug-in architecture, and each core runtime instance is in communication with other concurrent core runtime engine instances. At least one of the plurality of personalities is associated with each one of the plurality of core runtime engine instances. Each personality provides the pre-defined functionality associated with that personality to the core runtime engine instance to which that personality is associated. The plug-ins are instantiated on the core runtime engine instances in accordance with the associations between the personalities and the core runtime engine instances.

In one embodiment, a schema containing parameters is used to validate each plug-in. In one embodiment, each plug-in is expressed in extensible mark-up language, and the schema is also expressed in extensible mark-up language.

In one embodiment, a description is provided for each plug-in that contains a core definition including instructions for loading and starting each plug-in, a properties section including a set of plug-in properties specific to that plug-in and a dependencies section including a description of relationships between that plug-in and another other plug-in. The configuration manager is used in communication with each core runtime engine instance to determine an architecture for the distributed environment and to instantiate plug-ins on the appropriate core runtime engine instances. In one embodiment, an interface mechanism is used in communication with the configuration manager to facilitate instantiations of the core runtime engine on the host in accordance with the determined architecture.

In one embodiment, each plug-in is designated as either a non-shared plug-in or a shared plug-in. A non-shared plug-in shares a given instance of that plug-in with only one additional plug-in, and a shared plug-in shares the given plug-in instance with two or more additional plug-ins. In one embodiment, a plug-in instance management application program interface is used to facilitate dynamic runtime management of each plug-in. The dynamic runtime management includes plug-in definition creation, plug-in definition retrieval, plug-in definition updating, plug-in definition deletion, plug-in instance loading, plug-in instance unloading, plug-in instance reloading and combinations thereof. In one embodiment, dependencies among the plurality of plug-ins are determined, and the plug-ins are instantiated in accordance with the dependencies.

In one embodiment, a proxy is deployed on a first core runtime engine instance. The proxy is associated with a plug-in instance on a second core runtime instance, and the proxy is used to facilitate utilization of the plug-in instance by the first core runtime instance. A proxy application program interface can be used to facilitate dynamic runtime management of the proxy. This dynamic runtime management includes finding plug-ins, finding proxies, creating a plug-in for a proxy, destroying a proxy for a plug-in, static proxy routing, dynamic proxy routing and combinations thereof. In one embodiment, the plurality of personalities collectively form a job control system, and each one of the pre-defined functions can be a dispatcher, a submit agent, a node controller, an optimizer, a dispatcher shadow, a resource manager or combinations thereof.

BRIEF DESCRIPTION OF THE DRAWINGS

FIG. 2 is an embodiment of a table containing associations between core runtime engine instances and personalities;

FIG. 3 is an embodiment of a table containing associations between personalities and plug-ins;

FIG. 4 is an illustration of an embodiment of an extensible mark-up language document definition of a plug-in;

FIG. 11 is an illustration of an embodiment of a plug-in properties interface;

FIG. 12 is an illustration of an embodiment of an orchestrator plug-in;

FIG. 13 is an illustration of an embodiment of properties of the orchestrator plug-in;

FIG. 14 is an illustration of an embodiment of a persistence plug-in;

FIG. 15 is an illustration of an embodiment of a database manager plug-in and its properties;

FIG. 16 is an illustration of an embodiment of communication plug-ins;

FIG. 17 is an illustration of an embodiment of hypertext transfer protocol plug-ins;

FIG. 18 is an illustration of an embodiment of a timing services plug-in;

FIG. 19 is an illustration of an embodiment of a parser plug-in;

FIG. 20 is an illustration of an embodiment of an application program interface plug-in;

FIG. 21 is an illustration of an embodiment of a node controller plug-in; and FIG. 22 is an illustration of an embodiment of an optimizer plug-in.

DETAILED DESCRIPTION

Systems and methods in accordance with the present invention are directed to middleware that facilitates a distributed architecture for managing applications through plug-in configuration. Each of the distributed components in the distributed architecture includes at least one instance of a core runtime engine, and the various instances of the core runtime engine are communicating or cooperating to manage the application. Each instance of the core runtime engine is customized using one or more of a plurality of plug-ins. These plug-ins are also referred to as services, i.e. services that are utilized by the core runtime engine, and represent a basic unit of functionality that can be associated with or utilized by a given core runtime engine instance. The plug-ins associated with a given core runtime engine through the customization process provide a complete personality, i.e. functionality, to that core runtime engine. The customization of the distributed components is managed using a configuration facility.

By customizing each distributed component, i.e. each instance of the core runtime engine, based upon a required or desired personality, associating only those plug-ins required for that personality and allowing the various instances of the core runtime engine to communicate and share resources, the footprint occupied by the entire application across the distributed environment is minimized. In addition, the complexity of the distributed application is reduced by assembling the application using exactly the required parts, i.e. components and plug-ins. Distributable pluggable middleware services in accordance with the present invention are relatively simple and easy to configure and to administrate. This simplicity makes applications running these distributable services more conducive to small and medium sized business applications. In addition, systems and methods in accordance with the present invention are scalable by means of distributability.

Figure 1:
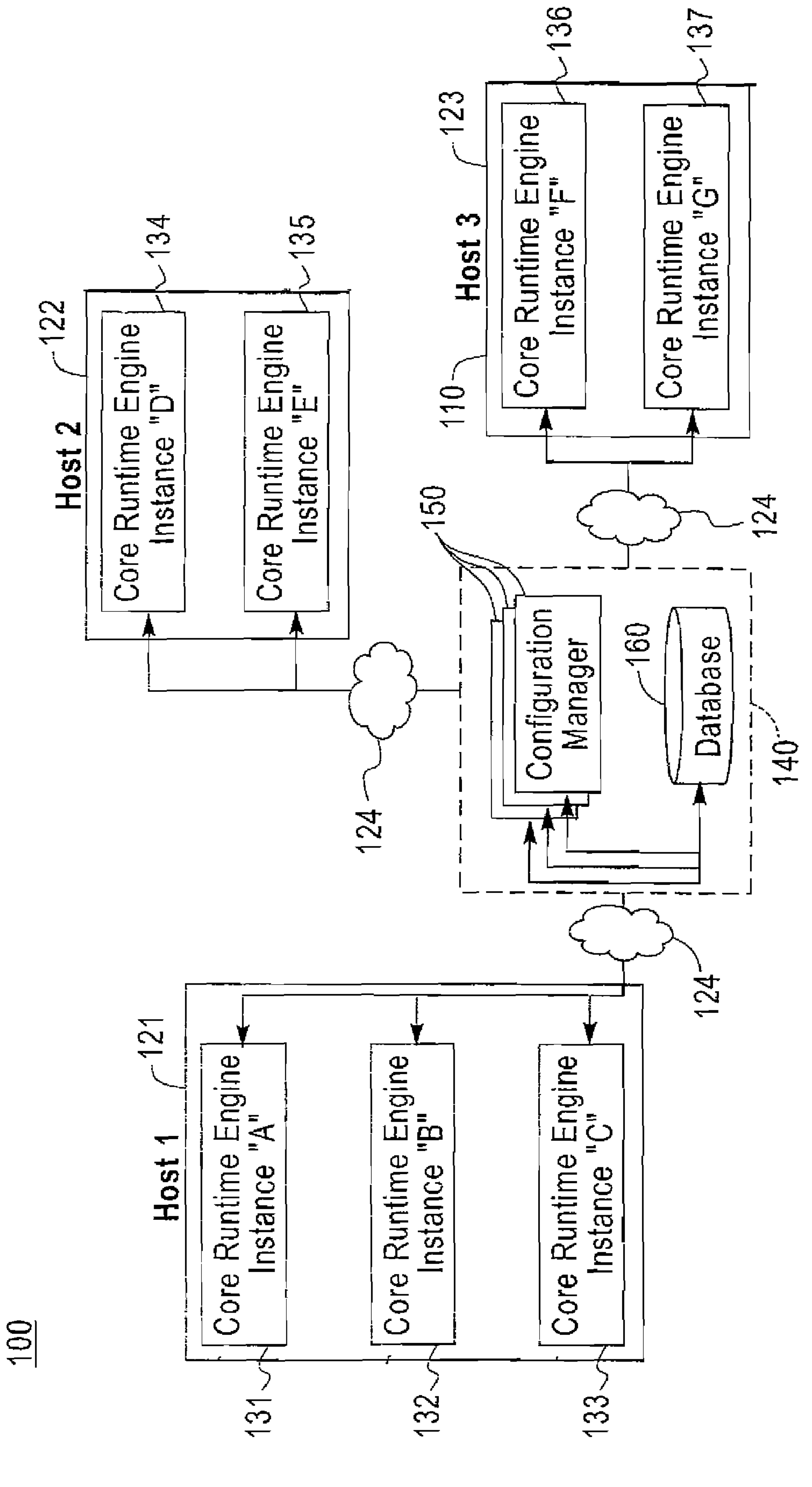
FIG. 1 is a schematic representation of an embodiment of a runtime architecture for distributed, pluggable middleware services in accordance with the present invention.

Referring initially to FIG. 1, an exemplary embodiment of a runtime architecture 100 for distributed, pluggable middleware services in accordance with the present invention is illustrated. The architecture includes a plurality of hosts 121, 122, 123. Suitable hosts include computer hardware platforms, e.g. nodes, servers or partitions within a distributed computing system, or virtual machines within, for example, a single node or server. Each host is capable of hosting an application that utilizes distributable pluggable middleware services in accordance with the present invention. The runtime architecture can include any desired number of hosts. As illustrated, the architecture includes three hosts, "Host 1" 121, "Host 2" 122 and "Host 3" 123.

Deployed on each host are one or more instances of core runtime engines (CREs). These instances can be multiple instances of a single core runtime engine or instances of two or more distinct core runtime engines. The various instances of the core runtime engine are in communication with each other and cooperate to share resources such as plug-ins. In general, the core runtime engine includes sufficient functionality for executing the distributed application, and in particular to support a distributed plug-in architecture on each one of the hosts or nodes. Preferably, the core runtime engine includes the minimum amount of functionality required to support plug-ins. In accordance with the illustrated exemplary embodiment, employed on "Host 1" 121 are core runtime engine instances "A" 131, "B" 132, and "C" 133. Employed on "Host 2" 122 are core runtime engine instances "D" 134 and "E" 135. Employed on "Host 3" 123 are core runtime engine instances "F" 136 and "G" 137.

The runtime architecture also includes one or more configuration facilities 140. Each core runtime engine instance is in communication with a configuration facility 140. In one embodiment, the core runtime engine instances are in communication with the configuration facility across one or more networks 124, including wide area networks and local area networks. The configuration facility manages the lifecycle of each core runtime engine instance and the distribution of plug-ins among the various core runtime engine instances. Each configuration facility includes one or more configuration managers 150. In one embodiment, a node or server within the architecture, for example a name server, identifies the particular configuration manager to be used for communication with a host and its core runtime engine instances. Any suitable communication layer can be used for communications between each core runtime engine instance and the configuration managers. Suitable communication layers include HyperText Transmission Protocol (HTTP). As illustrated, the configuration facility 140 includes three configuration managers 150; however, a given configuration facility can contain any desired number of configuration managers. Each configuration manager handles the configuration of the distributed architecture among the hosts including determining the number of core runtime engine instances, the location of these instances and the personality or function or each instance. In addition, the configuration manager provides for the distribution of the appropriate or desired plug-ins to one or more core runtime engine instances within the runtime architecture. Therefore, the configuration managers are responsible for providing core runtime engine instances with the plug-ins required for the desired personality. Each configuration manager is in communication with one or more persistent storage locations 160. Suitable persistent storage locations include databases 160. The databases can be in a single location or could be distributed throughout the architecture and in communication with the configuration managers across one or more networks. In one embodiment, persistent storage location is a flat file in a shared file space. In general, any suitable persistence storage mechanism can be used to provide the functionality of a database.

In order to facilitate communication between each host and the configuration managers for purposes of instantiating the core runtime engine on each host, each host contains an interface mechanism in communication with at least one configuration manager. In one embodiment, the interface mechanism is a single core runtime engine instance on each host that is designated as the bootstrap core runtime engine instance. The interface mechanism is responsible for the initialization and configuration of other core runtime engine instances on that host. Therefore, each interface mechanism is in communication with a configuration manager 150 in the configuration facility and in conjunction with the configuration manager determines the number of core runtime engine instances to materialize on its host and the personality or personalities that each materialized core runtime engine instance will provide. Having determined the number of core runtime engine instances and the type of each instance, the bootstrap core runtime engine instance clones itself once for each additional core runtime engine instance that is specified by the configuration manager. Therefore each core runtime engine instance begins with the same basic or base structure and the appropriate personalities are added to these base structures through the addition of plug-ins. Communications between interface mechanisms and configuration managers can be either push, where a configuration manager sends a notification to each host, or pull where each host requests its configuration from a configuration manager. In one embodiment, both push and pull communication models are used. For example, pull communication is used for initial host core runtime engine launching, and push communication is used for subsequent configuration changes.

Referring to FIG. 2, an exemplary embodiment of a personality configuration table 200 for use in assigning personalities to core runtime engine instances in accordance with the present invention is illustrated. The data contained within the table are maintained in the persistent storage or database 160 that is in communication with the configuration managers 150. Therefore, each configuration manager has access to the data in the table and can read data from or write data to the table. The table 200 includes a list of the core runtime engine instances 210 employed on the various hosts within the architecture and a list of the personalities 220 associated with each listed core runtime engine instance. Each core runtime engine instance is an independent process running on a software platform, for example Linux, or an independent thread within a Java Virtual Machine (JVM). As shown, CRE instance “A” 211 is assigned the personality “dispatcher” 221, and CRE instance “B” 212 is assigned two personalities “submit agent” and “node controller” 222. CRE instance “C” 213 is assigned the personality “submit agent” 223, and CRE instance “D” 214 is assigned the personality “node controller” 224. CRE instance “E” 215 is also assigned the personality “node controller” 225. CRE instance “F” 216 is assigned the personality “optimizer” 226, and CRE instance “G” 217 is assigned three personalities “dispatcher shadow”, “submit agent” and “node controller” 227.

In one embodiment, a resource management personality is used that gathers runtime information, for example node utilization metrics, and makes this information available to subscribers, such as an optimizer or scheduler for use in decision making about how to distribute workload. The statistics reporting portion of this personality may be provided by one or more plug-ins located on each of a relatively large set of participating nodes, while the metrics repository management and query portion of this personality is provided by one or more plug-ins located on a single or just a few nodes.

Each personality relates to a functionality that the associated CRE instance is to provide within the distributed architecture. CRE instances having multiple personalities provide multiple functionalities. For example, CRE instance “B” has two personalities, “submit agent” and “node controller”. When CRE instance “B” is launched, for example using the bootstrap CRE instance, the plug-ins, that is the runtime code, required to express the functions “submit agent” and “node controller” are employed or instantiated on CRE instance “B”. Therefore, the core runtime engine has been modified or customized specifically to provide the desired function. In addition to being assigned a given personality at initiation or start-up, the personalities of CRE instances can be altered over time.

In one embodiment, the configuration managers 150 determine the location, i.e. host and CRE instance, for the various personalities. In making these determinations, the configuration managers utilize one or more schemes. In one embodiment, the scheme is a static configuration where each personality is assigned to one or more hosts and those personalities remain with the assigned host. In another embodiment, a dynamic configuration is used where the configuration managers use a plurality of measurements, e.g., central processing unit (CPU) utilization, service request rates and service agreement commitments, among others, initially to place personalities among the hosts and subsequently to move personalities among these hosts. In another embodiment, the configuration manager determines the location of personalities based upon manual input for example from operators or systems administrators and input from program driven interfaces.

Having matched personalities to the various hosts and in particular to the core runtime engine instances employed on those hosts, the requisite plug-ins that constitute these personalities are provided to the appropriate core runtime engine instances. In one embodiment, each one of a plurality of personalities is matched to one or more of a plurality of plug-ins, for example in table format. Referring to FIG. 3, an exemplary embodiment of a personality and plug-in configuration table 300 is illustrated. The data contained within the table are maintained in the persistent storage or database 160 that is in communication with the configuration managers 150. Therefore, each configuration manager has access to the data in the table and can read data from or write data to the table. The table includes a list of personalities 310 and an associated list of plug-ins 320. As illustrated, the list of plug-ins includes a set or collection of plug-ins that is associated with each personality. Each plug-in set includes one or more individual plug-in definitions. Thus as illustrated, the personality “dispatcher” 311 is associated with the plug-in set “orchestrator”, “persistence”, “database-manager”, “communication”, “http-transport”, “timing-services”, “parser” and “graph-manager-interface” 321, and the personality “submit agent” 312 is associated with the plug-in set “communication”, “http-transport”, “persistence”, “database-manager” and “job-submission” 322. The personality “node controller” 313 is associated with the plug-in set “communication”, “http-transport”, “parser” and “process-controller” 323, and the personality “optimizer” 314 is associated with the plug-in set “communication”, “http-transport” and “scheduling-optimizer” 324. The personality “dispatcher shadow” 315 is associated with the plug-in set “orchestrator-backup”, “persistence”, “database-manager”, “communication”, “http-transport”, “timing-services”, “parser” and “graph-manager-interface” 325.

Each plug-in set includes the individual plug-ins that express the corresponding personality. For example, the plug-ins “communication”, “http-transport” and “scheduling-optimizer” taken together form a set that expresses the “optimizer” personality. Each individual plug-in is further defined by a plug-in description that includes the runtime code that provides at least a portion of the desired functionality to the personality to which the plug-in has been associated.

Referring to FIG. 4, an exemplary embodiment of a plug-in description 400 in accordance with the present invention is illustrated. As illustrated, the plug-in description 400 corresponds to a “graph-manager-interface” plug-in 330 (FIG. 3). This plug-in constitutes, in part, both the “dispatcher” 311 and “dispatcher-shadow” 315 personalities. Any suitable language can be used to express the description of a plug-in. In one embodiment, the plug-in description is represented as an extensible mark-up language (XML) document. The validity of the XML representation of the plug-in description is provided by making the XML representation conform to an XML schema.

In one embodiment, the XML schema used to validate the plug-in description is as follows:

```
<xsd:schema xmlns:xsd="http://www.w3.org/2001/XMLSchema"
        targetNamespace="http://www.ibm.com/megasys/plugin"
        xmlns:plugin="http://www.ibm.com/megasys/plugin"
        elementFormDefault="qualified"
>
<xsd:element name="plugin" type="plugin:pluginType"/>
<xsd:complexType name="pluginType">
   <xsd:sequence>
      <xsd:element name="httpmap"     type="plugin:httpMapType"
minOccurs="0" maxOccurs="1"/>
      <xsd:element name="properties"   type="plugin:propertiesType"
minOccurs="0" maxOccurs="unbounded"/>
```

```
        <xsd:element name="property"    type="plugin:nvPairType"
minOccurs="0" maxOccurs="unbounded" />
        <xsd:element name="list"        type="plugin:listType"
minOccurs="0" maxOccurs="unbounded"/>
        <xsd:element name="requires"    type="plugin:requiresType"
minOccurs="0" maxOccurs="1"/>
        <xsd:element name="runtime"     type="plugin:runtimeType"
minOccurs="0" maxOccurs="1"/>
    </xsd:sequence>
    <xsd:attribute name="id"            type="xsd:string"
use="required"/>
    <xsd:attribute name="version"       type="xsd:string"
use="required"/>
    <xsd:attribute name="name"          type="xsd:string"
use="required"/>
    <xsd:attribute name=                type="xsd:string"
"threadname"
use="optional"/>
    <xsd:attribute name="start-in-thread" type="xsd:boolean"
use="optional" default="false"/>
    <xsd:attribute name="class"         type="xsd:string"
use="required"/>
    <xsd:attribute name="interface"     type="xsd:string"
use="optional"/>
    <xsd:attribute name="load"          type="xsd:boolean" use="optional"
default="true"/>
    <xsd:attribute name="managed"       type="xsd:boolean" use="optional"
default="true" />
    <xsd:attribute name="implicit-import" type="xsd:boolean"
use="optional" default="false" />
</xsd:complexType>
<xsd:complexType name="httpMapType">
    <xsd:attribute name="path"   type="xsd:string" use="required"/>
    <xsd:attribute name="get"    type="xsd:string" use="optional"
default="doGet"/>
    <xsd:attribute name="post"   type="xsd:string" use="optional"
default="doPost"/>
</xsd:complexType>
<xsd:complexType name="requiresType">
    <xsd:sequence>
        <xsd:element name="import" type="plugin:importType"
minOccurs="0" maxOccurs="unbounded"/>
    </xsd:sequence>
</xsd:complexType>
<xsd:complexType name="importType">
    <xsd:attribute name="id"            type="xsd:string" use="optional"/>
    <xsd:attribute name="plugin"        type="xsd:string" use="required"/>
    <xsd:attribute name="version"       type="xsd:string" use="required"/>
    <xsd:attribute name="optional"      type="xsd:boolean" use="optional"
default="true"/>
</xsd:complexType>
<xsd:complexType name="runtimeType">
    <xsd:sequence>
        <xsd:element name="library"   type="plugin:uriType"
minOccurs="0" maxOccurs="unbounded"/>
        <xsd:element name="class"     type="plugin:uriType" minOccurs="0"
maxOccurs="unbounded"/>
    </xsd:sequence>
</xsd:complexType>
<xsd:complexType name="listType">
  <xsd:sequence>
      <xsd:element name="item" type="plugin:itemType" minOccurs="1"
maxOccurs="unbounded" />
  </xsd:sequence>
  <xsd:attribute name="id" type="xsd:string" use="required" />
</xsd:complexType>
<xsd:complexType name="itemType">
  <xsd:attribute name="value" type="xsd:string" />
</xsd:complexType>
<xsd:complexType name="uriType">
    <xsd:attribute name="uri" type="xsd:anyURI"/>
</xsd:complexType>
<xsd:complexType name="propertiesType">
    <xsd:attribute name="uri" type="xsd:anyURI"/>
    <xsd:attribute name="instance" type="xsd:token"/>
</xsd:complexType>
```

```
<xsd:complexType name="nvPairType">
    <xsd:attribute name="name" type="xsd:token"/>
    <xsd:attribute name="value" type="xsd:token"/>
</xsd:complexType>
</xsd:schema>
```

In general, the plug-in description 400 includes three sections, a core definition section 410, a properties section 420 and a dependencies or relationships section 430. Each plug-in includes a core definition section, and the core definition section is plug-in specific. The core definition section 410 contains a list of a plurality of name-value pairs. These name-value pairs are used by CRE instances to load and start the plug-in. As illustrated, the name "class" 411 has an associated value "com.ibm.megasys.jnm.core.DgmManager". This value designates the runtime code that performs the desired plug-in functionality. Each CRE instance utilizing this plug-in fetches and loads this runtime code. In one embodiment, a CRE instance fetches and loads a Java implementation of the runtime code from a jar file. The name "id" 412 has an associated value "com.ibm.megasys.dgm". This is the identity of the plug-in, and this identity can be used by other plug-ins to designate prerequisites by reference. The value of "id", i.e. the identity, is unique with respect to all plug-ins employed on a given CRE instance. In addition to using the identity, plug-ins can locate and utilize other plug-ins via the Plug-in Instance Management API, which is discussed in more detail below. The name "implicit-import" 413 has the associated value "false". In general, this name indicates whether or not other plug-ins are required to specify explicitly an import statement in order to employ this plug-in. If "true", the other plug-ins need not specify an import. Since the value is "false, the other plug-ins are required to specify an import statement. Imports are discussed further below with respect to the dependencies section 430.

The name "interface" 414 has the associated value "com.ibm.megasys.jnm.runtime.IRunnable". The value of "interface" designates one or more interfaces to which the plug-in conforms. This can be used by referencing plug-ins to query and/or employ the functionality provided by the plug-in. The value of the name "load" 415 indicates when to load the plug-in. As illustrated, "load" has the value "true", which indicates that the plug-in is loaded at CRE boot-time, as part of the initialization process of the CRE instance displaying the appropriate personality. If the value is false, then the plug-in is loaded on-demand, for example whenever another plug-in employs its interface to perform one or more of its capabilities. The value of name "managed" 416 indicates whether the plug-in is shared by other plug-ins. As illustrated, the value is "true", indicating that the plug-in is employed within a CRE instance as a singleton by all plug-in referring to it. When the value is false, each referencing plug-in employs its own copy of the non-shared plug-in. The name "name" 417 has an associated value of "JMN graph manager interface". This value is intended as documentation that can be read, for example by a user or system administrator.

The name "start-in-thread" 418 has an associated value, in this case "true", that indicates whether the plug-in is to be started in its own thread. When true, the plug-in, when loaded, is started in its own thread. When false, the plug-in is not started in its own thread but is used inline by other plug-ins. The name "threadname" 419 has an associated value, in this case "dgm", that is used for threaded plug-ins in order to label the underlying code thread, for example a Linux thread associated with the plug-in thread. The name "version" 424 has an associated value, in this case "1.0", which indicates the version of the plug-in. This value is used when determining suitability for resolving plug-in dependencies. The names "xmlns" 425 and "xmlns:xsd" 426 and their associated values are used to resolve the applicable schema for verification of conforming XML documents describing the plug-in. Defaults may apply for optional name-value pair that are not specified.

The properties section 420 contains a set of optional plug-in properties that the associated runtime code, in this example specified by the class "com.ibm.megasys.jnm.core.DgmManager" 411, can ascertain in order to configure itself. Each optional plug-in property is defined in terms of a name-value pair. The properties section is specific to a given plug-in; however, a given plug-in may not have a properties section in its description. Each CRE instance provides the plug-in implementation code access to its plug-in properties via a plug-in properties interface. Suitable plug-in properties interfaces include, but are not limited to, Java interfaces 1100 as illustrated, for example in FIG. 11. This provides the interface to obtain the properties listed in the properties section at runtime. In one embodiment, names and values are arbitrary strings, and in the case of duplicate names, only one corresponding value is utilized. The string values may be converted to another representation, e.g., double or boolean, among others, by using the appropriate plug-in properties interface method.

Any number of additional plug-in properties can be provided. As illustrated, three additional plug-in properties are specified. The additional plug-in property having the name "dgm.support.level" 421 has a corresponding value "native". The additional plug-in property having the name "dgm.logger.id" 422 has the corresponding value "com.ibm.megasys.orchestrator", and the addition plug-in property having the name "dgm.retry.interval" 423 has the corresponding value "5". Each of these additional plug-in properties is accessible by the runtime code, i.e. the specified class 411, by invoking an interface supplied by the framework of the present invention, as shown in FIG. 11. For example, the runtime code may invoke runtime.getStringProperty("dgm.support.level") 427 (FIG. 11) to obtain the corresponding value of that string name, i.e. "native". In one embodiment, a given plug-in has no properties. In another embodiment, a given plug-in has one or more properties. Properties may also be specified by utilizing the "properties uri=<location>" capability in the plug-in XML definition, where entries declared at the specified Uniform Resource Identifier (URI) location are properties in the form of name-value pairs. Properties can also be specified as lists, as one skilled in the related art can determine from the schema given above. An exemplary embodiment of an XML definition specifying a list is illustrated in FIG. 20.

Returning to FIG. 4, the dependencies section 430 includes a set of plug-ins that the present plug-in requires for full functionality. Each plug-in can have a dependencies section; however, a given plug-in may not have any relationships or dependencies and therefore would not have a dependencies section. This section provides the relationships between a given plug-in and any other plug-in including dependencies. The CRE instance loads plug-ins in dependency order. In one embodiment, the plug-in under consideration for loading on the CRE instance requires one or more prerequisite plug-ins loaded first. Alternatively, there is no prerequisite plug-ins that needs to be loaded first. When prerequisite plug-ins exists, the framework of the present invention will fail to load and execute the plug-in whose dependency cannot be loaded, resulting in a runtime exception. In the latter case, the present plug-in may operate at reduced functionality or efficiency when the plug-in upon which it depends does not exist or cannot be loaded. Each dependency is bracketed by a begin 431 and end 435 "requires" indicator. When the name "optional" 432 is specified as "false", then the framework of the present invention will not successfully load the plug-in unless its dependency is resolved. When the value associated with this name is "true", then the plug-in will be loaded even if the dependency cannot be loaded. The names "plug-in" 433 and "version" 434 have values, in this case "com.ibm.megasys.orchestrator" and "1.1" respectively. These values are used to load the dependent plug-in. Matching occurs between the plug-in 433 and version 434 values specified in the dependencies section with the id 412 and version 424 specified by other plug-ins core definitions. Again, a given plug-in can have no dependencies or can have one or more dependencies. Dependencies may be recursive, in that each successive plug-in attempting to load may have one or more dependencies.

Figure 5:
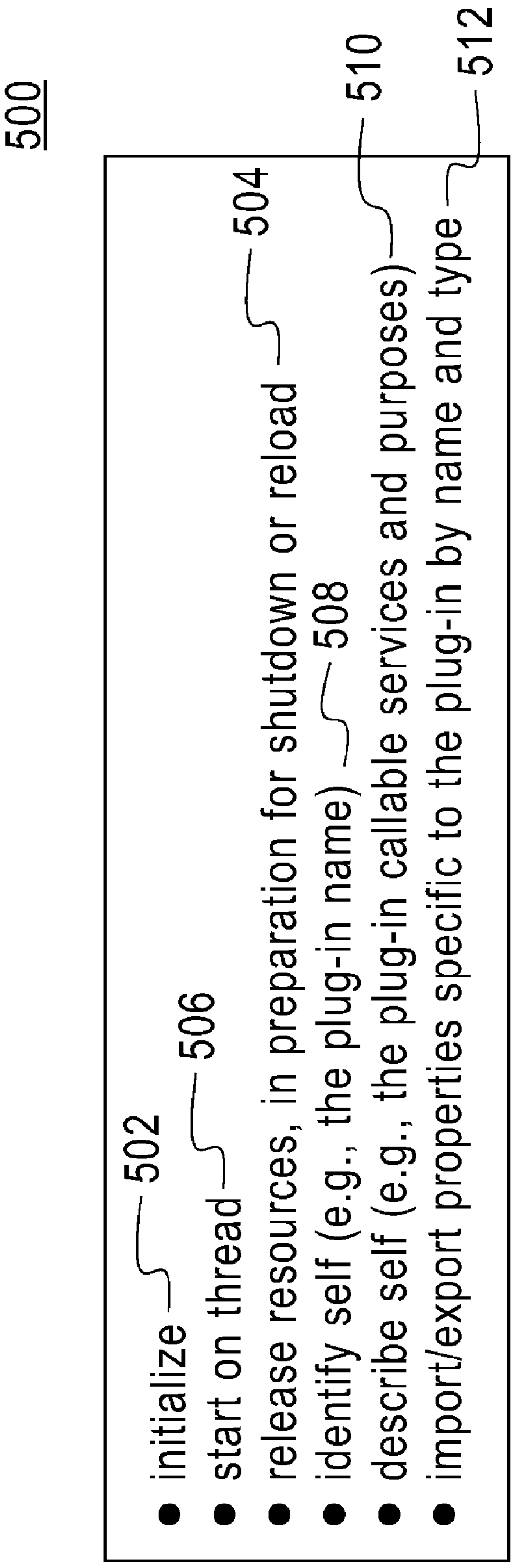
FIG. 5 is an illustration of an embodiment of a runtime interface for lifecycle and query operations that compliant plug-ins implement.

Referring to FIG. 5, an exemplary embodiment of functions 500 that are implemented by a plug-in implementer are illustrated. The plug-in implementer is the runtime code 411 (FIG. 4) that is specified by a plug-in definition 400. This plug-in definition 400, in part or in whole, contains the personality 310 (FIG. 3) that is a component 131, 134, 136 (FIG. 1) of a distributed application deployed to a collection of hosts 121, 122, 123.

The initialize function 502 is part of the plug-in lifecycle and is implemented by all plug-in implementers, i.e. classes 411 that implement a plug-in. The initialize function 502 is invoked by a plug-in manager, e.g., a CRE instance (FIG. 2), when loading the plug-in class. The plug-in class implementer can assume that dependencies have already been initialized. The release function 504 is also part of the plug-in lifecycle and is implemented by all plug-in implementers. The release function 504 is invoked by a plug-in manager, e.g., a CRE instance (FIG. 2), when unloading the plug-in class. The implementer releases any allocated resource to prevent "leaks".

The start-on-thread function 506 is part of the plug-in lifecycle for those plug-ins where start-in-thread 418 (FIG. 4) has the value "true". The start-on-thread function 506 is invoked by the plug-in manager, e.g., the CRE instance(FIG. 2), starting a threaded plug-in, as indicated in the plug-in definition. The functions provided by the identify-self 508, e.g., the plug-in name, and describe-self 510, e.g., the plug-in callable services and purposes, are optional and are provided by plug-in implementers when it is desired to have these attributes discovered dynamically at runtime by, for example, other plug-ins. In addition, these two functions allow more flexibility for plug-ins that do not wish to have, for example, optional dependencies explicitly specified in the plug-in definition, but would prefer to discover other plug-ins which may be employed at runtime instead.

Plug-in implementers are also provided with functions that allow the implementers to import and to export the additional plug-in properties 420 (FIG. 4). For self-configuration purposes, a plug-in implementer imports a given property by asking for the value associated with that property. The plug-in implementer then uses that value to specialize itself in a particular fashion. For example, if an additional plug-in property 420 name-value pair is security="code red", then the plug-in configures itself to run with a higher security level that the default level, which might be "code green". A plug-in also exports properties that other plug-ins may query, for example to understand the security level of another plug-in. Therefore, the list also provides specific import and export properties 512 to the implementer.

In addition to the basic minimum functionalities described, each plug-in can provide additional functionality as desired. This additional functionality can be employed by other plug-ins using the import mechanism described herein. Therefore, if one plug-in provides a dispatching service, another plug-in can import that dispatching service and utilize the dispatching service to perform dispatching service functions. The ability to import, export and utilizes functionalities provides a loose coupling between service requester and service provider by means of importing and employing interfaces distributed across a cluster of nodes or hosts, forming a unified operating environment.

Figure 6:
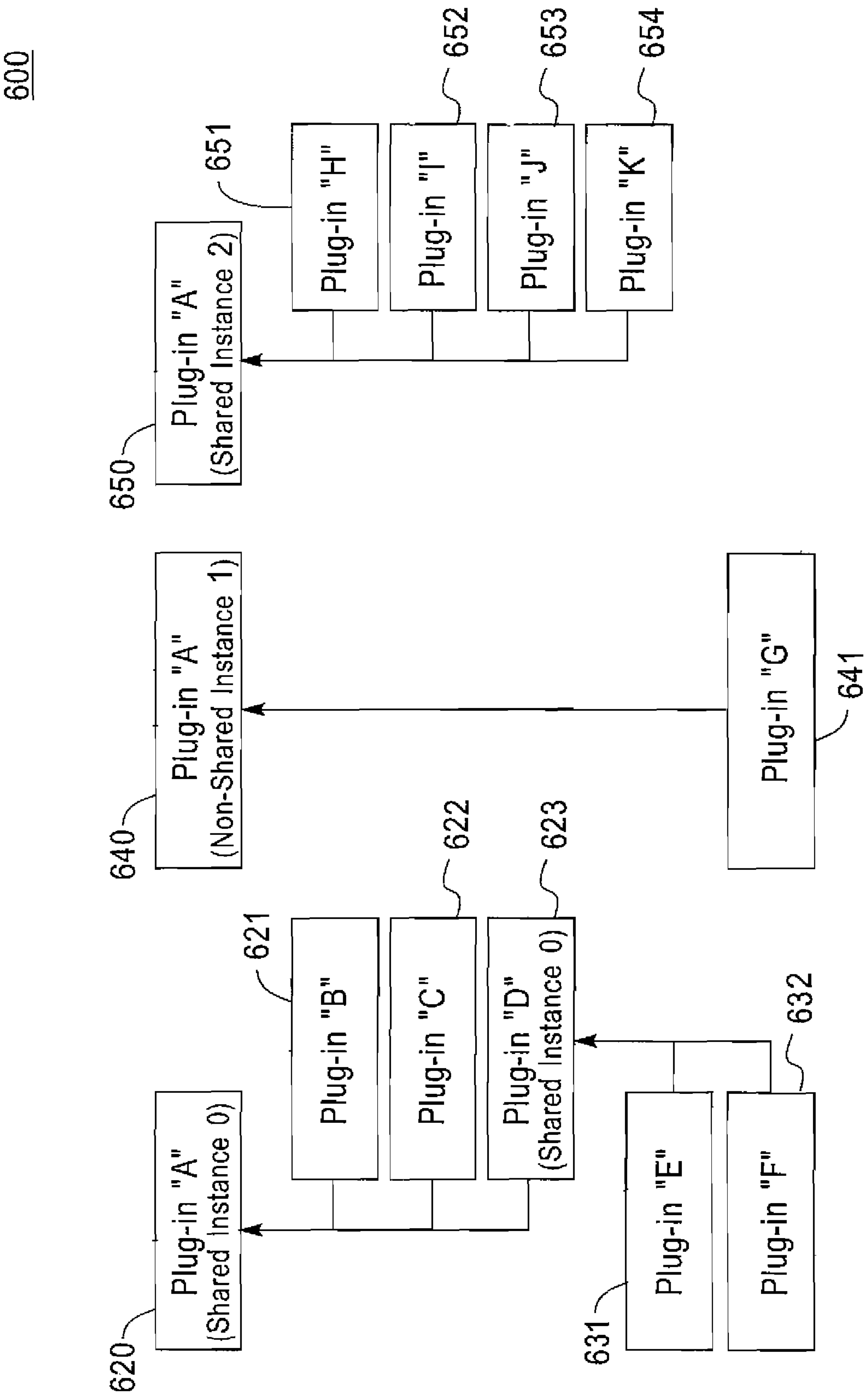
FIG. 6 is an illustration of an embodiment of runtime plug-in sharing.

In addition, the various core runtime engine instances can share one or more instances of a given plug-in. Referring to FIG. 6, an exemplary embodiment of plug-in instance sharing 600 is illustrated. An application includes a plurality of plug-ins that are deployed in a distributed environment. For example, the application can be a job manager that receives batch job requests and schedules them to be performed within a collection of nodes. In one embodiment, plug-in "A" performs inter-personality communication, for example sending a message between the optimizer and the dispatcher or between the dispatcher and a node agent. The application can include a plurality of instances of plug-in "A", including two shared instances 620, 650 and one non-shared 640. The non-shared instance of plug-in "A" 640 can be utilized by exactly one other plug-in, plug-in "G" 641. When an instance of a plug-in is shared, more than one plug-in can utilize the shared plug-in. As illustrated, the first shared instance of plug-in "A" 620 is shared by three plug-ins, plug-in "B" 621, plug-in "C" 622 and plug-in "D" 623. The second shared instance of plug-in "A" 650 is shared by four plug-ins, plug-in "H" 651, plug-in "I" 652, plug-in "J" 653 and plug-in "K" 654.

In one embodiment, plug-ins that utilize a shared or non-shared plug-in can themselves be either shared or non-shared. For example, plug-in "D" 623 is a shared instance that is shared by two plug-ins, plug-in "E" 631 and plug-in "F" 632. As used herein, shared means that the same context, e.g., Java class instance, is employed by all plug-ins employing a given instance. Conversely, non-shared means that there is a unique context, e.g., Java class instance, for each dependency. The ability to share or not to share facilitates a reduction in the code footprint through sharing and an isolation of plug-ins when sharing is not desirable, for example, for security reasons.

Figure 7:
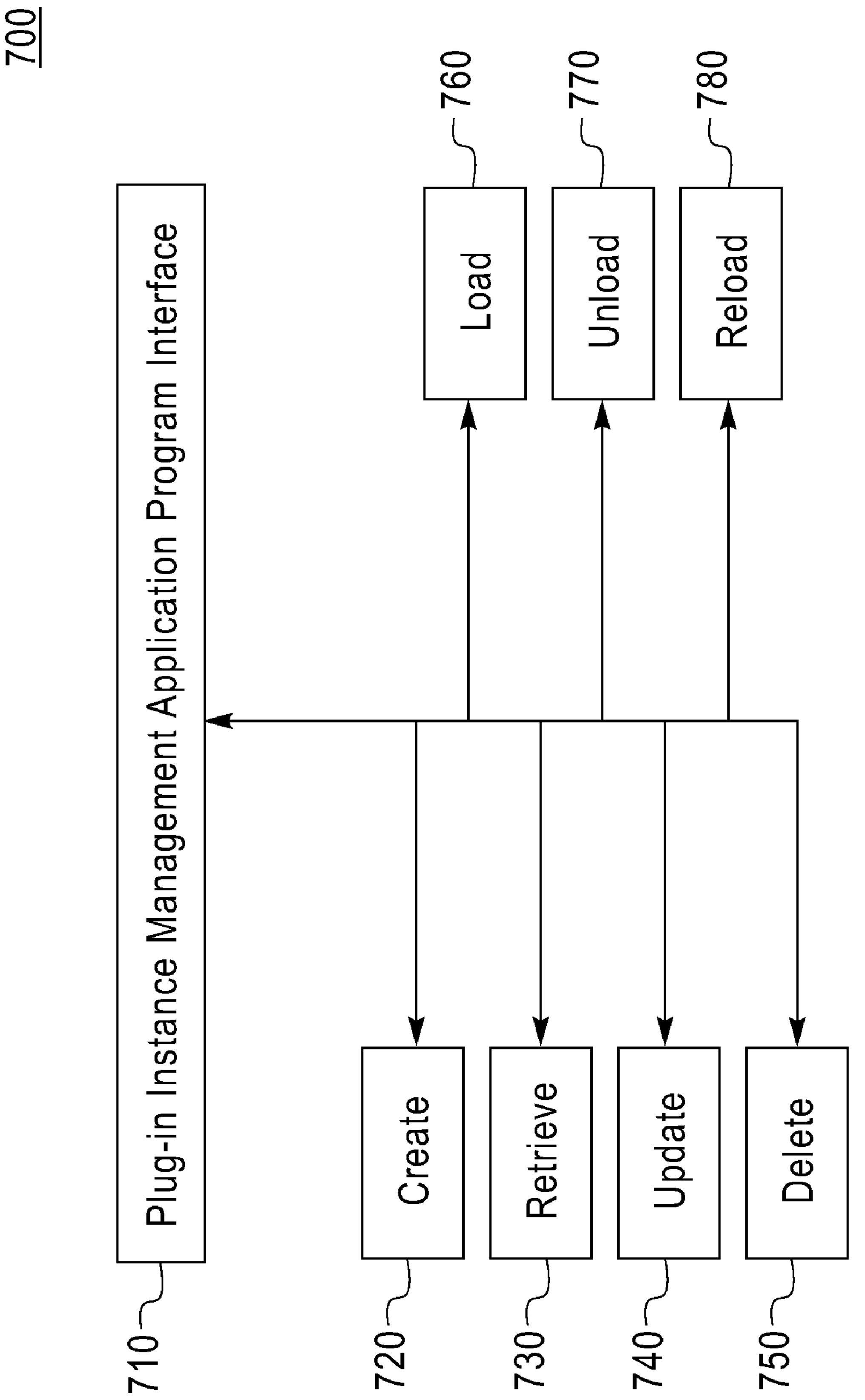
FIG. 7 is an illustration of an embodiment of a runtime interface for managing plug-in instances.

Referring to FIG. 7, an exemplary embodiment of plug-in instance management 700 using an application program interface (API) is illustrated. The API shows the functions provided by an embodiment of the framework containing the present invention to control plug-in lifecycle. The API provides for the dynamic manipulation of plug-ins during runtime. The plug-in instance management API 710 includes the functions that constitute lifecycle management including, but not limited to, create 720, retrieve 730, update 740, delete 750, load 760, unload 770 and reload 780. The create API 720 is used to install a plug-in, for the example the plug-in 400 of FIG. 4, definition in the configuration manager 150 database 160 (FIG. 1). The delete API 750 is used to remove a plug-in definition from the configuration manager database. The update API 740 is used to modify a plug-in definition in the configuration manager database. The retrieve API 730 is used to fetch a plug-in definition in the configuration manager database. The load API 760 is used to launch the runtime code comprising a plug-in definition in the configuration manager database. The unload API 770 is used to reverse the launch process for a previously launched plug-in definition in the configuration manager database. The reload API 780 effects the sequential performance of the unload and load functions.

In one embodiment, when loading, unloading, and reloading a plug-in, the target CRE instance and a host or node within the distributed hierarchy is specified as part of the operation parameters. Alternatively, the target CRE instance and host are determined in the database 160 of the configuration manager 150. In one embodiment, both the operation parameters and the database are used to specify the target CRE instance and the host.

Figure 8:
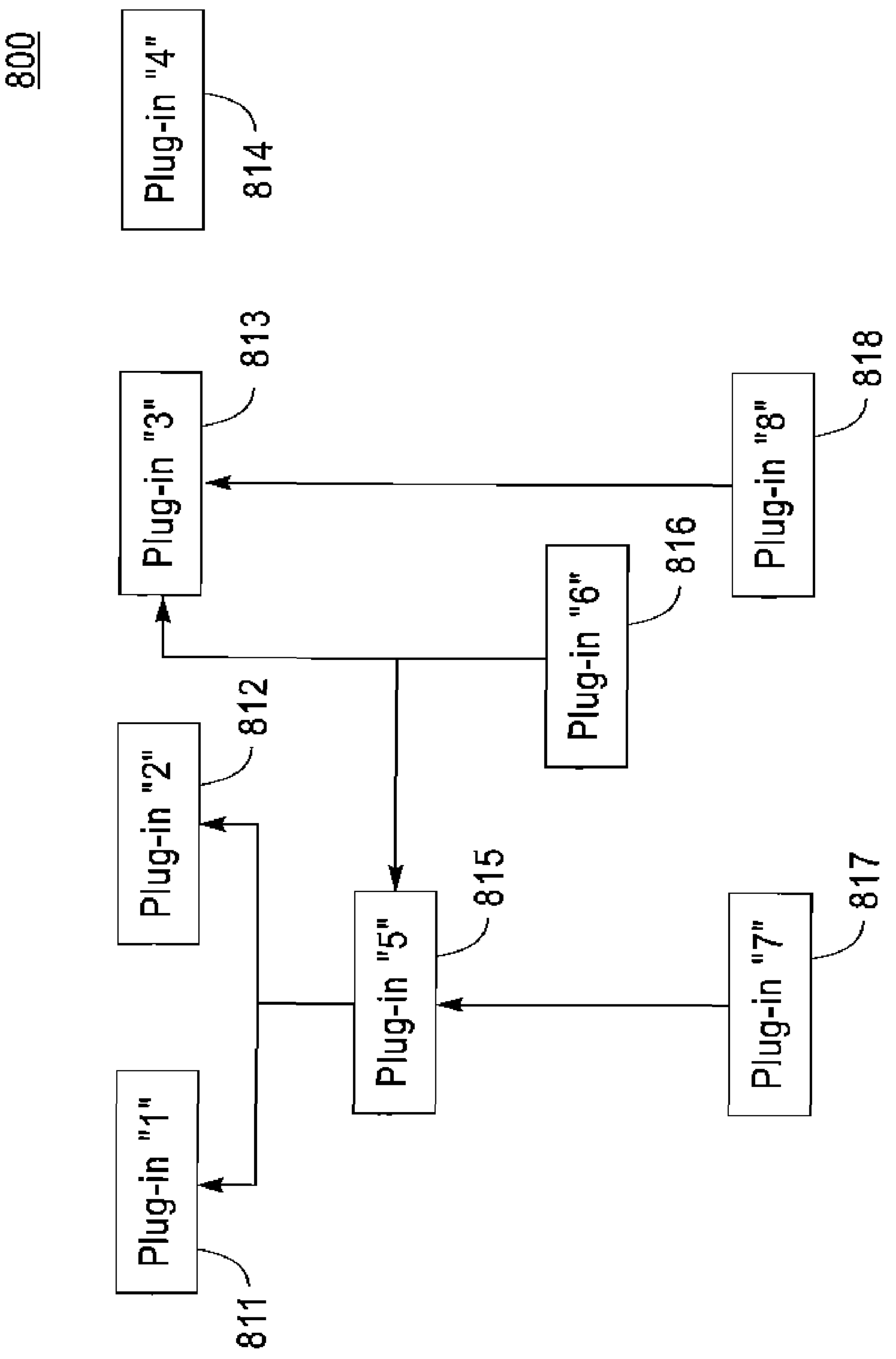
FIG. 8 is an illustration of an embodiment of plug-in dependency.

Referring to FIG. 8, an exemplary embodiment of plug-in dependency 800 in accordance with the present invention is illustrated. As illustrated, the dependencies are constructed by the plug-in manager, i.e. the CRE instance, by parsing the dependencies specified in each plug-in 400 (FIG. 4) that contains a plug-in set 320 (FIG. 3) defining personalities 310 to be deployed as determined by a configuration manager 150 (FIG. 1). This dependency graph enables the plug-in manager to load and start all plug-ins and prerequisites. To load correctly, the dependencies of each plug-in are first determined and loaded. This process of determining and loading the dependencies of each plug-in is repeated recursively until all dependencies have been loaded. The resulting graph represents all of the plug-ins in a given plug-in set associated with a personality. To load plug-in "7" 817, plug-in "5" 815 is loaded first. However, before plug-in "5" is loaded, plug-in "1" 811 and plug-in "2" 812 are loaded. To load plug-in "6" 816, plug-in "3" 813 and plug-in "5" 815 are loaded first, but before plug-in "5" is loaded its prerequisites, plug-in "1" 811 and plug-in "2" 812 are loaded first. To load plug-in "8" 818, plug-in "3" 813 is loaded first. Plug-in "4" 814 can be loaded without having to load any prerequisite plug-ins first.

Figure 9:
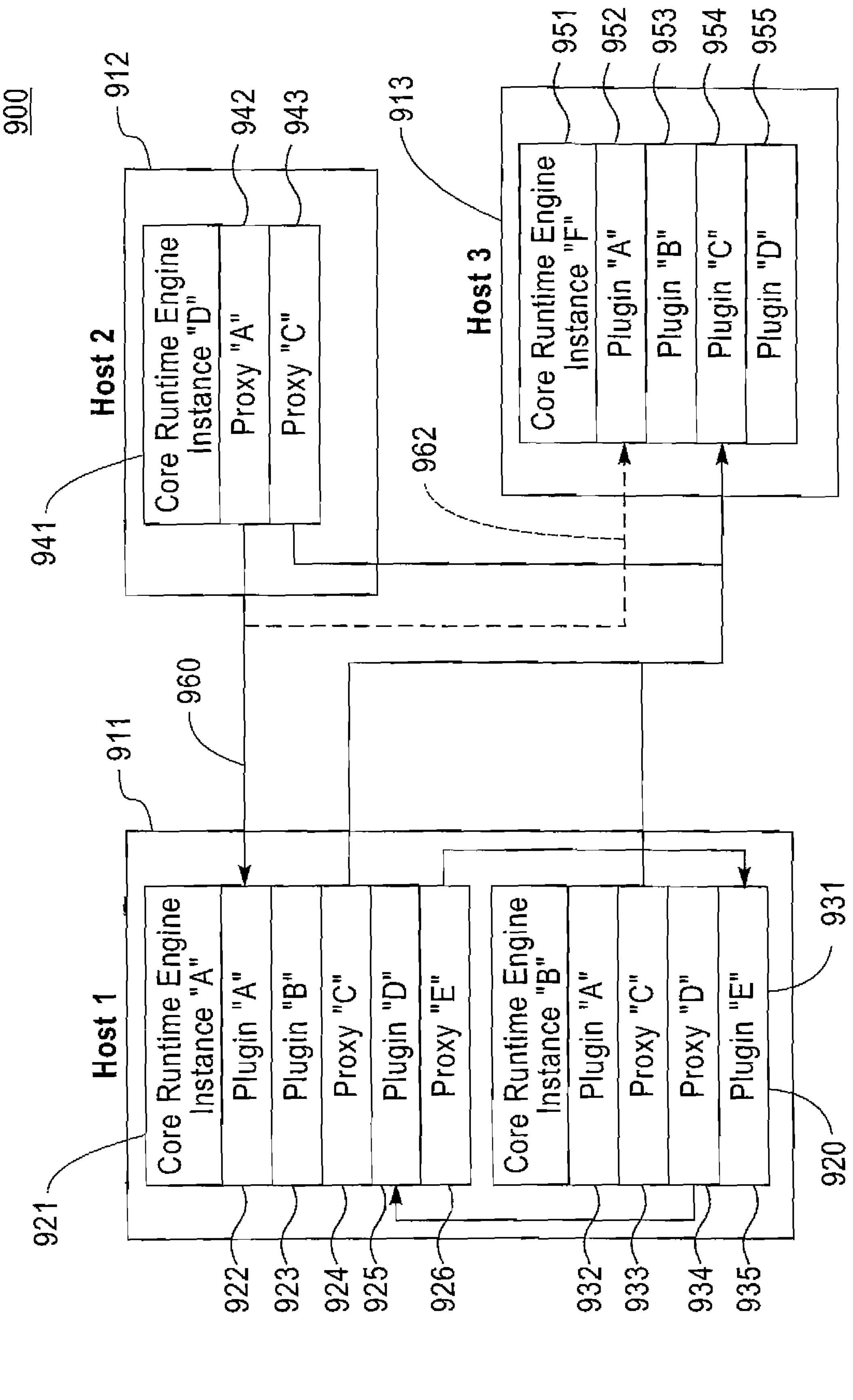
FIG. 9 is an illustration of an embodiment of a runtime distribution of plug-ins employing local proxies to access remote plug-ins.

Sharing of plug-ins instances is facilitated through the use of proxies. Referring to FIG. 9, an exemplary embodiment of example relationships 900 for remotable plug-ins is illustrated. The exemplary relationships include three hosts and four CRE instances upon which the plug-ins and proxies are deployed. On a first host, Host "1" 911, CRE Instance "A" 921 and CRE instance "B" 931 are deployed. CRE instance "A" includes Plug-in "A" 922, Plug-in "B" 923, Proxy "C" 924, Plug-in "D" 925 and Proxy "E" 926. CRE Instance "B" 931 includes Plug-in "A' 932, Proxy "C" 933, Proxy "D" 934 and Plug-in "E" 935. Deployed on a second host, Host "2" 912, is CRE instance "D" 941 that includes Proxy "A" 942 and Proxy "C" 943. Deployed on a third host, Host "3" 913, is CRE instance "F" 951 that includes Plug-in "A" 952, Plug-in "B" 953, Plug-in "C" 954 and Plug-in "D" 955.

In general, these CRE instances and plug-ins function as described as above. In addition to the plug-ins, proxies are deployed in the CRE instances. These proxies allow CRE instances to delegate one or more functions to a remote CRE instance. For example, Proxy "C" 924 on Host "1" 911 instructs CRE Instance "A" 921 to delegate requests for Plug-in "C" functionality to the Plug-in "C" 954 on Host "3" 913. Similarly, Proxy "C" 933 on Host "1" 911 instructs CRE Instance "B" 931 to also delegate requests for Plug-in "C" functionality to the Plug-in "C" 954 on Host "3" 913. Proxies facilitate both inter-host and intra-host delegation of function. For example, Proxy "D" 934 requests are delegated from CRE Instance "B" 931 to Plug-in "D" 925 within CRE Instance "A" 921, i.e. intra-host as both CRE instances are located on Host "1" 911. A given CRE instance can contain any number of proxies, and in one embodiment, a CRE instance is composed entirely of proxies, as illustrated, for example, by CRE Instance "D" 941, which contains Proxy "A" 942 and Proxy "C" 943. Conversely, a CRE instance may contain no proxies, as illustrated in CRE instance "F" 951. A proxy 942 may be routed to one of several plug-ins 952,922. Re-routing may be a onetime switch or may be multiple switching occurrences based upon a routing function. The routing function could be based upon round robin, connectivity availability or performance, among other factors.

Figure 10:
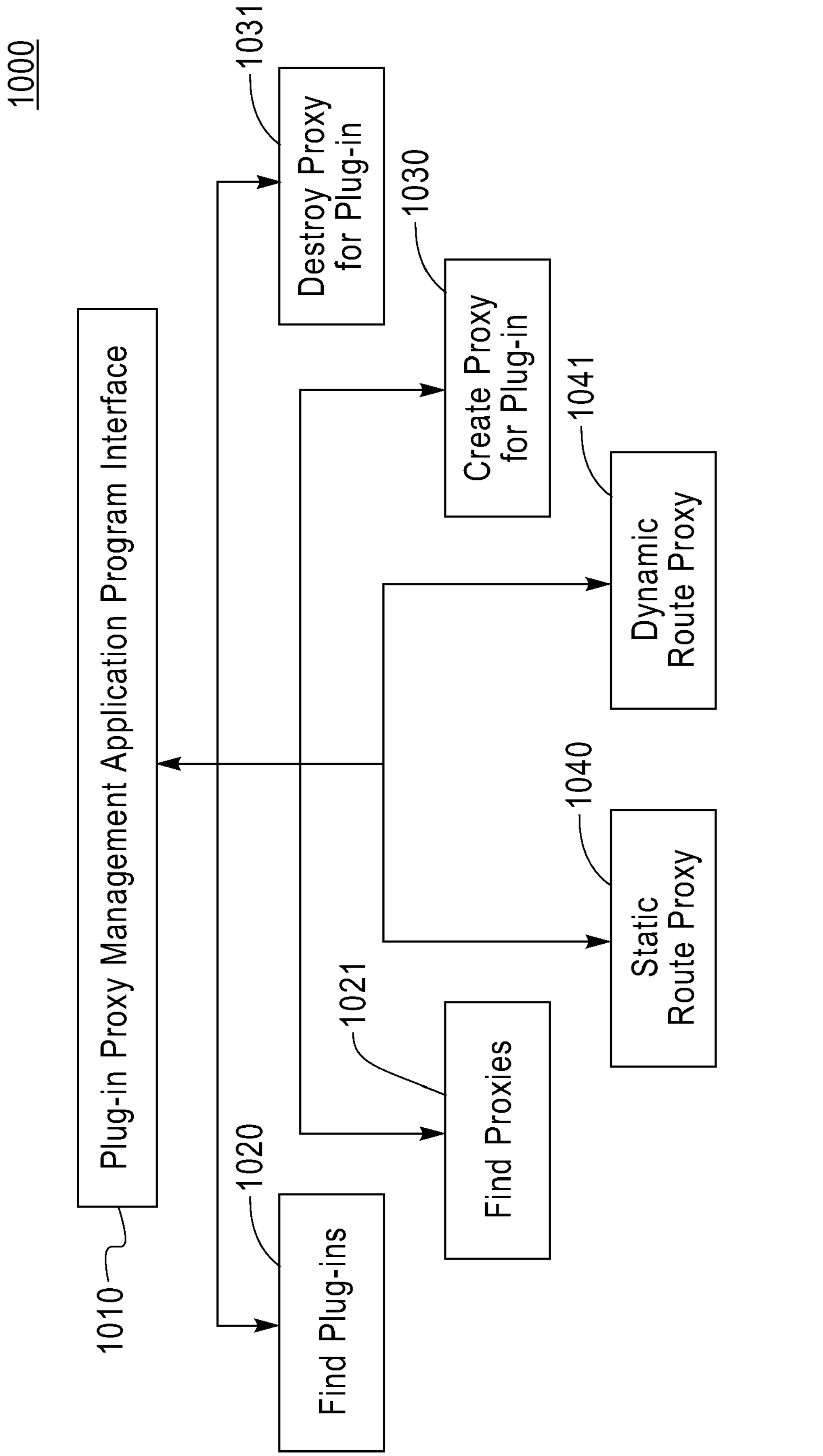
FIG. 10 is an illustration of an embodiment of a runtime interface for managing distributed plug-ins.

Referring to FIG. 10, an exemplary embodiment of proxy management 1000 utilizing an application program interface (API) in accordance with the present invention is illustrated. The proxy management utilizes a plug-in proxy management API 1010 that provides for lifecycle control of proxies and that can be used in conjunction with the API 710 (FIG. 7) for lifecycle control of plug-in instances to manage the distribution of CRE functionality across a collection of nodes or hosts. In general, the API provides dynamic manipulation of the proxies during runtime. The API shows the functions provided by an embodiment of the framework comprising the present invention to control proxy lifecycle. The functions provided by the proxy lifecycle management include, but are not limited to, find plug-ins 1020, find proxies 1021, create proxy for plug-in 1030, destroy proxy for plug-in 1031, static route proxy 1040 and dynamic route proxy 1041. The find plug-ins 1020 API allows a program to locate one or more plug-ins within the distributed environment. Once a desired plug-in is found, the create proxy for plug-in 1030 API is employed to construct a handle for remote access to the corresponding plug-in. The proxy can be presented to a CRE instance when loading a personality in place of a plug-in. The routing of a proxy is changed by using either the static route proxy 1040 or dynamic route proxy 1040. In the case of static routing, the same target plug-in is employed when the proxy makes requests. In the case of dynamically routed proxies, a different compatible plug-in may be utilized for each request.

Returning to FIG. 9, Proxy "A" 942 is initially routed 960 to CRE Instance "A" 921 Plugin "A" 922. Subsequent to a static routing change, Proxy "A" 942 forwards requests 962 to CRE Instance "F" 951 Plug-in "A" 952. The destroy proxy for plug-in 1031 API is used to remove proxy forwarding, thus reverting to utilizing a local instance of the subject plug-in.

In addition to FIGS. 4 and 20, FIGS. 12-19 and 21-22 provide an illustration of additional exemplary plug-in descriptions that provide the properties that are personalities for dispatcher, submit agent, node controller, and optimizer. These personalities together form a distributed job control system that is constructed using the plug-ins methodology in accordance with the present invention. Jobs submission and control requests are submitted to a submit agent. Submitted jobs are evaluated by an optimizer for placement within a domain of nodes includes host and virtual machines, among others. A dispatcher communicates with node controllers selected by the optimizer to run each job element on the nodes selected by the optimizer. The optimizer makes adjustments with regard to lifecycle of jobs including, disbursement orders for distributed job elements to change locations and resource consumption, among others.

Referring to FIG. 12, an exemplary description of the orchestrator plug-in 1200 is given. This plug-in includes a core definition section 1210, a properties section 1220, which specifies a URL for properties, further illustrated by FIG. 13, and a dependencies section 1230. FIG. 13 illustrates the separately specified properties section 1300 for the orchestrator plug-in of FIG. 12. FIG. 14 provides an exemplary description of the persistence plug-in 1400. This plug-in includes a core definition section 1410, a properties section 1420 and a dependencies section 1430. Note that this plug-in requires plug-in "com.ibm.megasys.jmn.db", which provides database functionality for the persistence manager and is given by FIG. 15. FIG. 15 provides an exemplary description of the database manager plug-in 1500 and separate properties. Note that the database manager for an application constructed from plug-ins is logically, if not physically, separate from the database 160 used for plug-in configuration management. This plug-in includes a core definition section 1510 and a properties URL specification 1520 the contents of which are shown as separate properties 1521. This plug-in description does not include a dependencies section. FIG. 16 provides exemplary descriptions of two different communication plug-ins 1600. The first description includes a core definition section 1610 and a properties section 1620. The second description includes a different core definition section 1611 and no properties section. Neither description includes a dependencies section.

FIG. 17 provides exemplary descriptions of two different http transport plug-ins 1700. The first description includes a core definition section 1710 only. The second description includes a different core definition section 1711 and a dependencies section 1730. Neither description includes a properties section. FIG. 18 provides an exemplary description of a timing services plug-in 1800. This description only has the required core definition section 1810 and does not have either a properties section or a dependencies section. FIG. 19 provides an exemplary description of a parser plug-in 1900. This description includes a core definition section 1910 and a dependencies section 1930 but lacks a properties section. Referring to FIG. 20, an exemplary description of an application program interface plug-in 2000 is given. This plug-in includes a core definition section 2010, a properties section 2020 and a dependencies section 2030. FIG. 21 provides an exemplary description of a node controller plug-in 2100 having a core definition section 2110 and a properties section 2120 only, and FIG. 22 provides an exemplary description of an optimizer plug-in 2200 having a core definition section 2210, a properties section 2220 and a dependencies section 2230. Therefore, various arrangements of plug-in description are possible depending upon the description sections provided. A given plug-in can be varied by both including or excluding either a properties or dependencies section and by changing the actual content of a properties or dependencies section.

The personalities illustrated in FIG. 2 are realized by the plug-in sets illustrated in FIG. 3, and the plug-ins comprising the plug-ins sets of FIG. 3 are realized in whole or in part by the example plug-ins of FIGS. 13-22 to form a system application for distributed job management.

The distributed job control system may have its components managed by a configuration manager, which may be the distributed job control system itself. The optimizer may determine to which node or nodes each of its various components are distributed, which is in turn realized by the dispatcher and node controllers in combination.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for managing a computer application within a distributed environment in accordance with exemplary embodiments of the present invention and to the computer-executable code itself The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A runtime architecture for distributed plug-in configurable middleware for managing distributed applications, the architecture comprising:

a plurality of hosts, each host comprising a computer hardware platform;

at least one core runtime engine;

a plurality of personalities, each personality comprising a definition of a function;

a plurality of pre-defined plug-ins, each plug-in associated with one or more of the plurality of personalities and comprising runtime code that provides at least a portion of the function of each personality to which the plug-in is associated and the plurality of plug-ins comprising functional dependencies among the plug-ins, the dependencies comprising relationships among the plug-ins for communicating, cooperating and sharing resources among core runtime engine instances running on the plurality of hosts to achieve the distributed middleware;

a plurality of concurrent instantiations of the core runtime engine on the plurality of hosts, each core runtime engine instance comprising sufficient functionality to support plug-in architecture of the pre-defined plug-ins and modified by the pre-defined plug-ins to have personalities associated with those plug-ins, each core runtime instance in communicating, cooperating and sharing resources with other concurrent core runtime engine instances as provided by its associated plug-ins to contribute the functions associated with the personalities associated with the plug-ins used to modify that core runtime instance and to provide the dependencies among the plug-ins in order to establish the distributed middleware within a distributed computing system;

wherein each plug-in is utilized by each core runtime engine instance having an associated personality to which the plug-in is associated;

at least one configuration manager in communication with each one of the plurality of core runtime engine instances, the configuration manager capable of determining an architecture for the distributed middleware and of distributing plug-ins to the core runtime engine instances;

at least one persistent storage device in communication with the configuration manager and comprising the plurality of plug-ins;

wherein the host comprises an interface mechanism in communication with the configuration manager to facilitate instantiations of the core runtime engine on the host in accordance with the determined architecture; and wherein each plug-in comprises a core definition comprising instructions for loading and starting the plug-in, a properties section comprising a set of plug-in properties specific to that plug-in and a dependencies section comprising a description of the dependencies comprising the relationships between that plug-in and another plug-in.

2. The runtime architecture of claim 1, further comprising a schema comprising parameters for validating each predefined plug-in.

3. The runtime architecture of claim 2, wherein each plug-in comprises an extensible mark-up language document and the schema comprises an extensible mark-up language schema.

4. The runtime architecture of claim 1, wherein the plurality of hosts further comprises virtual machines.

5. The runtime architecture of claim 1, further comprising a plug-in instance management application program interface to facilitate dynamic runtime management of each plug-in.

6. The runtime architecture of claim 5, wherein the dynamic runtime management comprises creating plug-ins, retrieving plug-ins from a persistent storage location, updating plug-ins, deleting plug-ins, loading plug-ins, unloading plug-ins, reloading plug-ins or combinations thereof.

7. The runtime architecture of claim 1, wherein execution of one of the plurality of plug-ins is dependent upon execution of another one of the plurality of plug-ins.

8. The runtime architecture of claim 1, further comprising a proxy associated with a first core runtime engine instance, the proxy associated with a plug-in instance resident on a second core runtime instance and facilitating utilization of the plug-in instance by the first core runtime engine instance.

9. The runtime architecture of claim 8, further comprising a proxy management application program interface to facilitate dynamic runtime management of the proxy.

10. The runtime architecture of claim 9, wherein the dynamic runtime management comprises finding plug-ins, finding proxies, creating a plug-in for a proxy, destroying a proxy for a plug-in, static proxy routing, dynamic proxy routing or combinations thereof.

11. A method for managing a computer application within a distributed environment, the method comprising:

defining a plurality of personalities, each personality comprising a pre-defined function;

associating at least one plug-in with each personality, each plug-in comprising runtime code that provides at least a portion of the function of the personality to which the plug-in is associated and a function dependency with other plug-ins, this dependency comprising relationships between that plug-in and the other plug-ins for communicating, cooperating and sharing resources among core runtime engine instances running on a plurality of hosts to achieve the computer application within the distributed environment;

instantiating a core runtime engine on each one of the plurality of hosts within the distributed environment, each core runtime engine instance comprising sufficient functionality to support plug-in architecture and each core runtime instance in communication with other concurrent core runtime engine instances, and each host comprising a computer hardware platform;

associating at least one of the plurality of personalities with each one of the plurality of core runtime engine instances, each personality providing the pre-defined functionality associated with that personality to the core runtime engine instance to which that personality is associated;

instantiating plug-ins on the core runtime engine instances in accordance with the associations between the personalities and the core runtime engine instances to modify the core runtime engine instances to have associated personalities, the plurality of core runtime engine instances working together in accordance with their associated dependencies to contribute their associated functionalities and to establish a distributed computing system;

utilizing each plug-in by each core runtime engine instance having an associated personality to which the plug-in is associated;

using a configuration manager in communication with each core runtime engine instance to determine an architecture for the distributed environment and to instantiate plug-ins on the appropriate core runtime engine instances;

using an interface mechanism in communication with the configuration manager to facilitate instantiations of the core runtime engine on each host in accordance with the determined architecture; and providing a description for each plug-in comprising a core definition comprising instructions for loading and starting each the plug-in, a properties section comprising a set of plug-in properties specific to that plug-in dependencies section comprising a description of the dependencies comprising the relationships between that plug-in and another plug-in.

12. The method of claim 11, further comprising using a schema comprising parameters to validate each plug-in.

13. The method of claim 12, further comprising: expressing each plug-in in extensible mark-up language; and expressing the schema in extensible mark-up language.

14. The method of claim 11, further comprising designating each plug-in as either a non-shared plug-in for sharing a given instance of that plug-in with only one additional plug-in or a shared plug-in for sharing the given plug-in instance with two or more additional plug-ins.

15. The method of claim 11, further comprising using a plug-in instance management application program interface to facilitate dynamic runtime management of each plug-in.

16. The method of claim 15, wherein the dynamic runtime management comprises plug-in definition creation, plug-in definition retrieval, plug-in definition updating, plug-in definition deletion, plug-in instance loading, plug-in instance unloading, plug-in instance reloading or combinations thereof.

17. The method of claim 11, further comprising determining dependencies among the plurality of plug-ins and instantiating plug-ins in accordance with the dependencies.

18. The method of claim 11, further comprising: deploying a proxy on a first core runtime engine instance; associating the proxy a plug-in instance on a second core runtime instance; and using the proxy to facilitate utilization of the plug-in instance by the first core runtime instance.

19. The method of claim 18, further comprising using a proxy application program interface to facilitate dynamic runtime management of the proxy.

20. The method of claim 19, wherein the dynamic runtime management comprises finding plug-ins, finding proxies, creating a plug-in for a proxy, destroying a proxy for a plug-in, static proxy routing, dynamic proxy routing or combinations thereof.

21. The method of claim 11, wherein the plurality of personalities collectively comprise a job control system and the pre-defined functions comprise a dispatcher, a submit agent, a node controller, an optimizer, a dispatcher shadow, a resource manager or combinations thereof.

22. A non-transitory computer-readable medium containing a computer-readable code that when read by a computer causes the computer to perform a method for managing a computer application within a distributed environment, the method comprising:

defining a plurality of personalities, each personality comprising a pre-defined function;

associating at least one plug-in with each personality, each plug-in comprising runtime code that provides at least a portion of the function of the personality to which the plug-in is associated and a function dependency with other plug-ins, this dependency comprising relationships between that plug-in and the other plug-ins for communicating, cooperating and sharing resources among core runtime engine instances running on a plurality of hosts to achieve the computer application within the distributed environment;

instantiating a core runtime engine on each one of the plurality of hosts within the distributed environment, each core runtime engine instance comprising sufficient functionality to support plug-in architecture and each core runtime instance in communication with other concurrent core runtime engine instances, and each host comprising a computer hardware platform;

associating at least one of the plurality of personalities with each one of the plurality of core runtime engine instances, each personality providing the pre-defined functionality associated with that personality to the core runtime engine instance to which that personality is associated;

instantiating plug-ins on the core runtime engine instances in accordance with the associations between the personalities and the core runtime engine instances to modify the core runtime engine instances to have associated personalities, the plurality of core runtime engine instances working together in accordance with their associated dependencies to contribute their associated functionalities and to establish a distributed computing system;

utilizing each plug-in by each core runtime engine instance having an associated personality to which the plug-in is associated;

using a configuration manager in communication with each core runtime engine instance to determine an architecture for the distributed environment and to instantiate plug-ins on the appropriate core runtime engine instances;

using an interface mechanism in communication with the configuration manager to facilitate instantiations of the core runtime engine on each host in accordance with the determined architecture; and providing a description for each plug-in comprising a core definition comprising instructions for loading and starting each the plug-in, a properties section comprising a set of plug-in properties specific to that plug-in and a dependencies section comprising a description of relationships between that plug-in and another other plug-in.

23. The non-transitory computer-readable medium of claim 22, wherein the method further comprises designating each plug-in as either a non-shared plug-in for sharing a given instance of that plug-in with only one additional plug-in or a shared plug-in for sharing the given plug-in instance with two or more additional plug-ins.

24. The non-transitory computer-readable medium of claim 22, wherein the method further comprises determining dependencies among the plurality of plug-ins and instantiating plug-ins in accordance with the dependencies.

25. The non-transitory computer-readable medium of claim 22, wherein the method further comprises: deploying a proxy on a first core runtime engine instance; associating the proxy a plug-in instance on a second core runtime instance; and using the proxy to facilitate utilization of the plug-in instance by the first core runtime instance.

26. The non-transitory computer-readable medium of claim 25, wherein the method further comprises using a proxy application program interface to facilitate dynamic runtime management of the proxy, the dynamic runtime management comprising finding plug-ins, finding proxies, creating a plug-in for a proxy, destroying a proxy for a plug-in, static proxy routing, dynamic proxy routing or combinations thereof.

27. A computing system comprising:

a plurality of hosts, each host comprising a computer hardware platform within the computing system, the computing system executing a plug-in configurable middleware for managing distributed applications, the middleware comprising:

a plurality of concurrent instantiations of a core runtime engine on at least one host, each core runtime time engine instance configured to support plug-in architecture and each core runtime engine instance in communication with other concurrent core runtime engine instances;

a plurality of pre-defined plug-ins, one or more of the plurality of plug-ins associated with one or more of the plurality of concurrent core runtime engine instances and each plug-in comprising runtime code that provides at least a portion of an additional function to the core runtime engine to which that plug-in is associated and the plurality of plug-ins comprising functional dependencies among the plug-ins, the dependencies comprising relationships among the plug-ins for communicating, cooperating and sharing resources among core runtime engine instances running on the hosts to achieve the middleware;

wherein each core runtime engine instance is modified by one of the pre-defined plug-ins to have the personality associated with that plug-in, contributes a function associated with that personality, communicates, cooperates and shares resources with other concurrent core runtime engine instances as provided by its associated plug-ins and provides the dependencies among the plug-ins in order to establish the middleware within a distributed computing system;

wherein each plug-in is utilized by each core runtime engine instance having an associated personality to which the plug-in is associated;

at least one configuration manager in communication with each one of the plurality of core runtime engine instances, the configuration manager capable of determining an architecture for the distributed middleware and of distributing plug-ins to the core runtime engine instances;

at least one persistent storage device in communication with the configuration manager and comprising the plurality of plug-ins;

wherein the host comprises an interface mechanism in communication with the configuration manager to facilitate instantiations of the core runtime engine on the host in accordance with the determined architecture; and wherein each plug-in comprises a core definition comprising instructions for loading and starting the plug-in, a properties section comprising a set of plug-in properties specific to that plug-in and a dependencies section comprising a description of the dependencies comprising the relationships between that plug-in and another plug-in.

* * * * *